United States Patent
Zang et al.

(10) Patent No.: US 9,542,963 B2
(45) Date of Patent: Jan. 10, 2017

(54) METHOD AND APPARATUS TO DETECT AND MITIGATE CONTAMINATION BETWEEN A READ/WRITE HEAD AND A RECORDING MEDIUM

(71) Applicant: Seagate Technology LLC, Cupertino, CA (US)

(72) Inventors: Qun Zang, Suzhou (CN); Meherab Amaria, Broomfield, CO (US); Ying Lin, Suzhou (CN); Aaron Jacobs, Belle Plaine, MN (US); Daniel Brown, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 139 days.

(21) Appl. No.: 14/661,522

(22) Filed: Mar. 18, 2015

(65) Prior Publication Data
US 2016/0275978 A1    Sep. 22, 2016

(51) Int. Cl.
*G11B 5/41*    (2006.01)
*G11B 5/60*    (2006.01)

(52) U.S. Cl.
CPC .............. *G11B 5/41* (2013.01); *G11B 5/6011* (2013.01); *G11B 5/6029* (2013.01); *G11B 5/6076* (2013.01)

(58) Field of Classification Search
CPC .......................................... G11B 5/40–5/6076
USPC .................... 360/31, 53, 55, 69, 75
See application file for complete search history.

(56) References Cited

U.S. PATENT DOCUMENTS

| | | | | |
|---|---|---|---|---|
| 7,436,620 B1* | 10/2008 | Kang | ................... | G11B 5/6005 360/75 |
| 7,440,220 B1* | 10/2008 | Kang | ................... | G11B 5/6005 360/75 |
| 8,665,546 B1 | 3/2014 | Zhao et al. | | |
| 8,730,610 B2* | 5/2014 | McFadyen | ........... | G11B 5/3133 360/75 |
| 8,970,983 B1* | 3/2015 | Watanabe | ............. | G11B 5/6011 360/75 |
| 8,995,078 B1* | 3/2015 | Setuwanto | ............... | G11B 5/41 360/75 |
| 2008/0100966 A1* | 5/2008 | Ozeki | ................... | G11B 5/6005 360/235.4 |
| 2008/0165446 A1* | 7/2008 | Partee | ................. | G11B 5/6005 360/75 |
| 2010/0027154 A1* | 2/2010 | Sonoda | ................ | G11B 5/6005 360/75 |
| 2010/0208387 A1* | 8/2010 | Ehrlich | ................ | G11B 5/6005 360/97.12 |
| 2010/0259848 A1* | 10/2010 | Nanba | ................... | G11B 5/6005 360/75 |
| 2014/0063644 A1* | 3/2014 | Lou | ..................... | G11B 5/6029 360/75 |

* cited by examiner

*Primary Examiner* — Wayne Young
*Assistant Examiner* — James L Habermehl
(74) *Attorney, Agent, or Firm* — Hollingsworth Davis, LLC

(57) ABSTRACT

A first adaptive fly height measurement is performed between a read/write head and a recording medium during a stage of qualification testing of a magnetic disk drive. A second adaptive fly height measurement of the read/write head is performed during a subsequent stage of the qualification testing. In response to determining that a fly height decrease between the first and second adaptive fly height measurements is above a threshold value, a mitigation operation is performed to remove a contaminant from a media-facing surface of the read/write head.

20 Claims, 7 Drawing Sheets

METHOD AND APPARATUS TO DETECT AND MITIGATE CONTAMINATION BETWEEN A READ/WRITE HEAD AND A RECORDING MEDIUM

SUMMARY

The present disclosure is directed to a method and apparatus used to detect and mitigate contamination between a read/write head and a recording medium. In one embodiment, a first adaptive fly height measurement is performed between a read/write head and a recording medium during a stage of qualification testing of a magnetic disk drive. A second adaptive fly height measurement of the read/write head is performed during a subsequent stage of the qualification testing. In response to determining that a fly height decrease between the first and second adaptive fly height measurements is above a threshold value, a mitigation operation is performed to remove a contaminant from a media-facing surface of the read/write head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices such as hard disk drives (HDDs). Generally, such devices include a magnetic read-write head that is held close to a recording medium such as a spinning magnetic disk. The read/write head of modern disk drives have a specially formed surface facing the medium, the surface often referred to as an air-bearing surface (ABS). The ABS has features that allow it to remain separated from the spinning disk via a thin layer of air, thereby maintaining a small clearance therebetween during read and write operations.

A number of HDD designs attempt to use very small clearances (e.g., on the order of 1 nm) between the read/write head and medium in order to increase areal density. The clearance between specific transducers in the read/write head (e.g., magnetoresistive sensor, write coil) and the medium can be further controlled dynamically by way of an actuator that affects local clearances. For example, the read/write head may include a heater that causes local thermal protrusion near the ABS. The amount of protrusion can be finely controlled by varying a current applied to the heater.

One side effect of small head-to-medium clearances is an increased chance of contamination affecting the spacing. While the disk drive may be assembled and sealed in a clean room environment, there are still stray materials that can accumulate on the ABS. For example, particles may be released when moving parts are first activated, and this can accumulate on the ABS. In some cases, this accumulation can affect performance. For example, in one configuration, an appreciable number of drives showed clearance changes in qualification testing that were likely due to contamination at the ABS. In the present disclosure, methods and apparatuses are described that can detect and mitigate this type of contamination.

Figure 1:
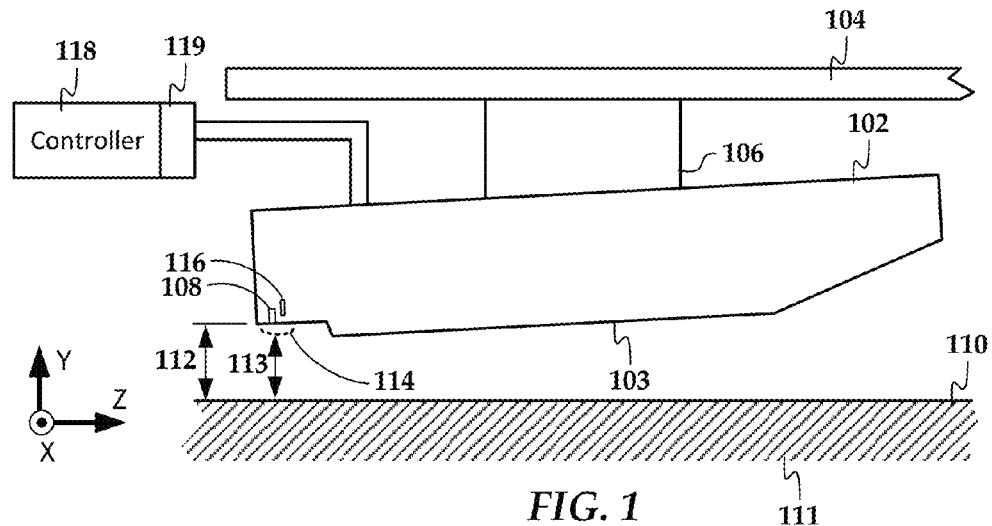
FIG. 1 is a block diagram of a hard drive slider and media arrangement according to an example embodiment.

In reference now to FIG. 1, a block diagram shows a side view of a read/write head 102 according to an example embodiment. The read/write head 102 may be used in a magnetic data storage device, e.g., magnetic hard disk drive. The read/write head 102 may also be referred to herein as a slider, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an ABS 103 (also referred to herein as a "media-facing surface") of the read/write head 102 when the recording medium 111 is rotating.

It is desirable to maintain a predetermined slider flying height 112 over a range of disk rotational speeds during both reading and writing operations to ensure consistent performance. Region 114 is a "close point" of the read/write head 102, which is generally understood to be the closest point of contact between the read/write transducers 108 and the magnetic recording medium 111, and generally defines the head-to-media spacing (HMS) 113. To account for both static and dynamic variations that may affect slider flying height 112, the read/write head 102 may be configured such that a region 114 of the read/write head 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114.

To provide this type of control over effective head-to-media spacing 113 via heat, the read/write head 102 may include (or otherwise be thermally coupled to) one or more heating elements 116. These heating elements 116 (e.g., resistance heaters) may be provided with selectable amounts of current by a controller 118. Generally, the controller 118 at least includes logic circuitry for controlling the functions of an apparatus that includes at least the read/write head 102 and recording medium 111. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the read/write head 102 and other components not shown.

Figure 2:
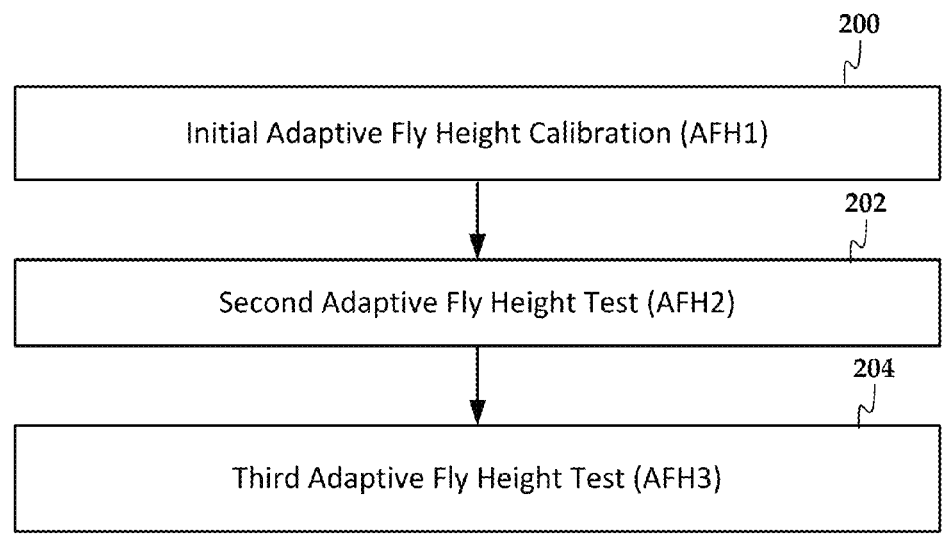
FIG. 2 is a flowchart illustrating a hard disk drive adaptive fly height testing procedure according to an example embodiment.

In FIG. 2, a flowchart illustrates a hard disk drive adaptive fly height (AFH) testing procedure according to an example embodiment. Adaptive fly height control is one subsystem that receives initial calibration and testing after assembly of the hard disk drive. The AFH procedure is used to ensure that, among other things, the desired clearance for read and write transducers is calibrated and maintained for subsequent testing phases. The procedure involves initial calibration 200 of the AFH system. The calibration may involve, for example, engaging a heater or other actuator to induce heat-to-medium contact to obtain a general measure of AFH range. Other actions may include writing a known pattern of data to the recording medium heater input values and/or reading back a known pattern of data at various heater input values. Using what is known as the Wallace equation, reading back these signals facilitates estimating head-to-media spacing (HMS) for a given heater input.

After the initial calibration is complete, additional AFH tests 202, 204 are run on each device. These tests 202, 204 are relatively longer running tests that involve reading/writing to different regions (e.g., radially-defined zones) of the media to ensure fly height and contact levels are consistent relative to the initial settings. Upon successfully passing these tests, the drive may go onto higher levels of testing.

Normally, the read/write contact value over all zones during test 204 should be the same or a little higher than read/write contact value over all zones of the previous testing stage 202. An example of this is seen in the left hand graph of FIG. 3. Curves 301-303 represent the HMS measured over a range of zones for respective first, second and third AFH testing stages (AFH1-3) for a particular head. The clearances vary in a predicable manner over the zones, e.g., due to skew, different relative linear velocity between head and medium, etc. Further, there are changes seen between each stage AFH1-3. These changes are also predictable to some extent. A slight increase in average spacing from the first test AFH1 to the last test AFH3 may occur due to lube interactions, burnish, etc.

Figure 3:
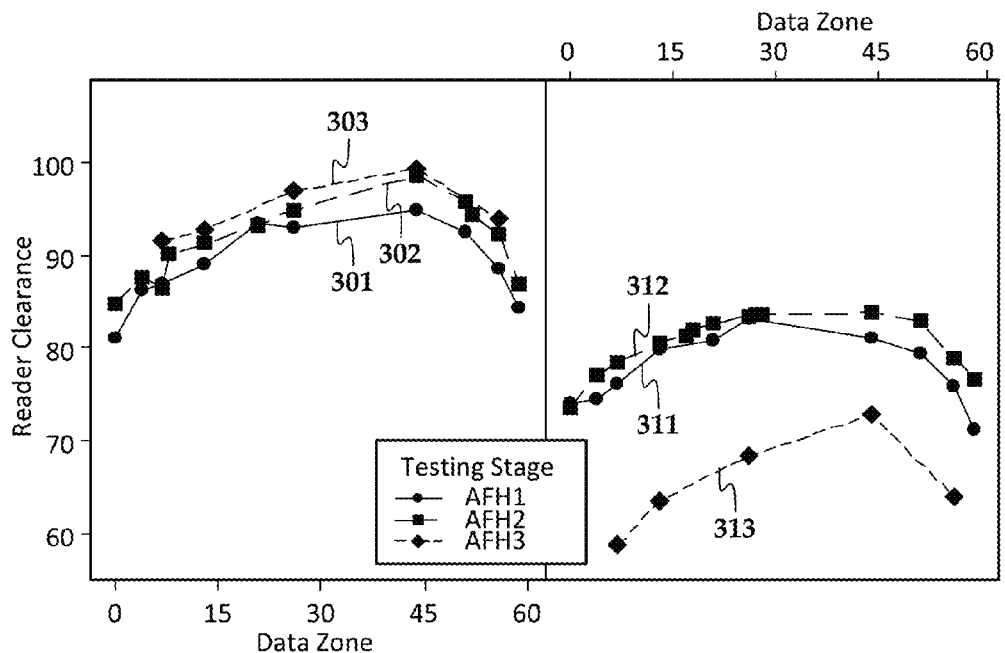
FIG. 3 is graph showing the head-media spacing measured over a range of zones for adaptive fly height testing stages according to an example embodiment.

In contrast, the right hand side of the graph of FIG. 3 shows an example of a significant change in average clearance between the second and third test for a different head, one which picks up contamination during AFH testing. Curves 311-313 represent the HMS measured over a range of zones for testing stages AFH1-3. As seen by curve 313, the AFH3 read/write clearance is much lower than AFH2 read/write clearance (curve 312). The clearance difference between AFH2 and AFH3 is determined collectively, e.g., via an average over all zones, zone-to-zone, by comparison of curves (or curve fits thereof), etc. The clearance differences seen between curves 312 and 313 are due to a build-up of material at the media-facing surface of the head. This build-up may be referred to herein as negative burnish.

One factor that causes negative burnish is contamination pickup. For example, small particles of materials such as MgSiO (talc) may accumulate on various locations of the read/write head's media-facing surface. One of these locations is a contact pad near the read or write transducers. The contact pad is configured to contact the media before the transducers to reduce damage to the transducers. Particles may also accumulate on other areas of the media-facing surface, such as the write pole, return pole, and read sensor.

Contamination of the media-facing surface can significantly change various aspects of the head-to-media interface. As previously noted, such contaminations may be detected based on decrease in the effective clearance detected at the AFH3 testing stage as compared to the AFH2 stage. If left unmitigated, this can result in lower heater power being applied, resulting in the wrong clearance settings being applied during reading and/or writing. Incorrect setting of clearance can result in bit error rate (BER) degradation. Also, mechanical effects of the contaminant can result in degraded write margins due to lower working heater power, skipping writes, increased modulation due to increased contact and friction at the head-media interface. These can result in degraded performance and/or early drive failure.

During the AFH calibration for one particular drive, a number of drives showed clearance inconsistency between AFH measurements. This inconsistency has been found to have largely been caused by contamination. This negatively affects the final yield of drive production. Preventing contamination is still a primary goal, but current head-media spacing is approximately 1 nm, and even very small contamination particles can cause this issue. Also, if the contamination can be removed and the original clearance restored, the drive will not need rework and test time can be saved.

Currently, when degradation during qualification testing as shown in FIG. 3 is found, the AFH2 and/or AFH3 may be re-run. However, if the head is still contaminated, the AFH values determined during these tests may be inaccurate even if they appear to fall within specification. If a read/write has too large of a clearance change after AFH re-test, the drive may be sent to rework process where a new head stack assembly and/or head-gimbal assembly is installed. Rework increases scrap cost and handling risk.

Before deciding to rework a disk drive assembly due to a failed AFH test, a procedure may be performed to mitigate or remove contamination that caused the test to fail. If the AFH failure is due to one or more heads of a disk drive having negative burnish, a contact event can be excited by contamination interacting with disk. Generally, the fly height actuator is driven to move the head closer to disk until the contact event is detected. For example, heater power can be ramped up by the smallest increment of the digital-to-analog converter (DAC), and kept running for a certain number of revolutions (e.g., 60 revs for high skew zones and 30 revs for low skew zones). At each heater step, a few zones are selected to at an outer diameter, middle diameter, and inner diameter. The read/write head moves over tracks in these zones while the heater power is increased.

Once contamination-to-disk contact is detected, the head will continue increasing protrusion while on a track. The maximum extra heater power is calculated depending on delta clearance ranking of AFH2 and AFH3 and heater induced reader protrusion (HIRP) to ensure accurate heater power is applied to effectively remove the contamination but not so much as to protrude beyond initial heater power and induce HDI risk such as lube depletion, damage to disc and to the protective diamond-like carbon (DLC) coating over the recording head. The specific heater power may be unique for each head.

Figure 4:
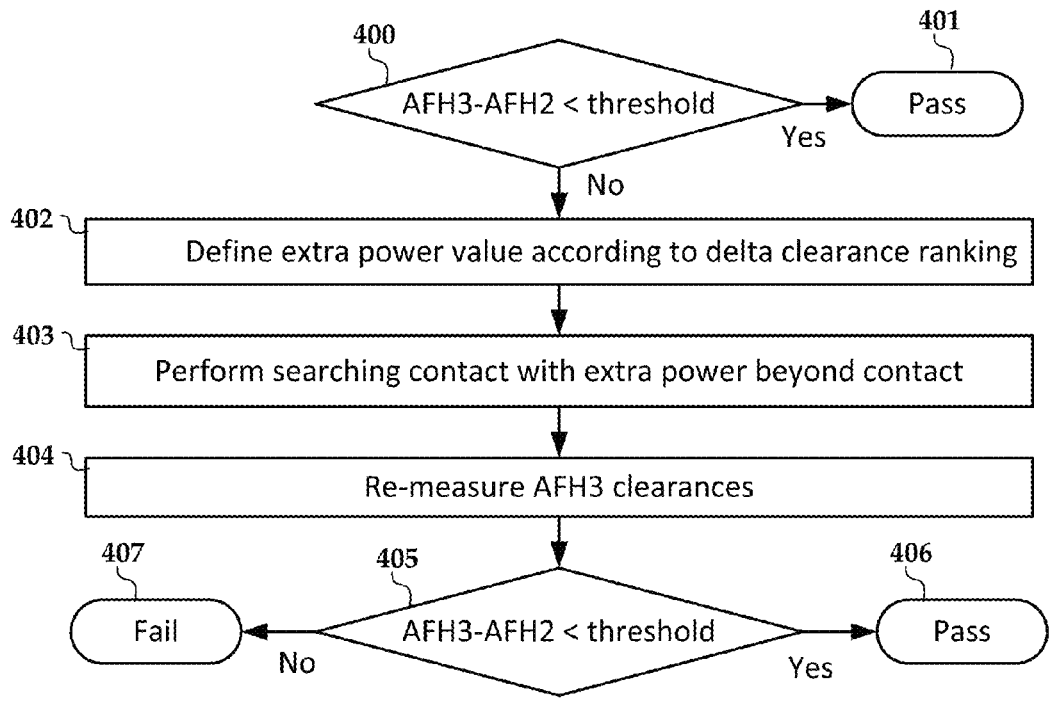
FIG. 4 is a flowchart illustrating a hard disk drive negative burnish detection and mitigation procedure according to an example embodiment.

This proposed mitigation procedure can be used at the AFH3 testing stage, which if successful, expected to have clearance values similar to AFH2. Afterwards, burnish check is performed to ensure correct AFH3 fly height. An example of such a procedure is shown in the flowchart of FIG. 4. After two stages of a qualification testing have occurred (AFH2 and AFH3 in this example), a determination 400 is made as to whether AFH clearance difference/delta between the stages have changed by a threshold amount. For example, this may be an averaged clearance over a number of zones, and the threshold may be 5 angstroms. The clearance delta is less than this value, the device passes 401.

If the clearance delta determined at block 400 is greater than the threshold, then an extra power value (e.g., DAC input to heater) is defined 402 according to the delta value. For example, assume the delta value $\Delta$=AFH3_clearance−AFH2_clearance. For one class of device, if $-5\,\text{Å} \geq \Delta > -10\,\text{Å}$, then heater DAC is increased by 5; if $-10\,\text{Å} \geq \Delta > -15\,\text{Å}$, then heater DAC is increased by 10; and if $-15\,\text{Å} \geq \Delta$, then heater DAC is increased by 15. Other DAC offsets and delta ranges may be used as appropriate for a particular device.

The extra power value determined at 402 is used for a searching contact, with the increase DAC added to whatever DAC value would nominally be expected to induce contact. Generally, searching contact may involve holding the head over one or more tracks of the recording medium until contact is detected (e.g., via a sensor on the read/write head). After the contact 403 has been performed for a predetermined time and/or over a predetermined area, the clearance value of the subsequent testing stage (AFH3) is re-measured 404. In other embodiments, both AFH2 and AFH3 may be re-measured. A second determination 405 is made regarding the delta clearance. If the clearance delta is below the threshold, the drive passes 406, and fails 407 otherwise. In some embodiments, the steps 402-404 may be repeated more than once before ultimately passing 406 or failing 407 the hard disk device. Additional details of a mitigation procedure are provided below in relation to the description of FIG. 8.

Figure 5:
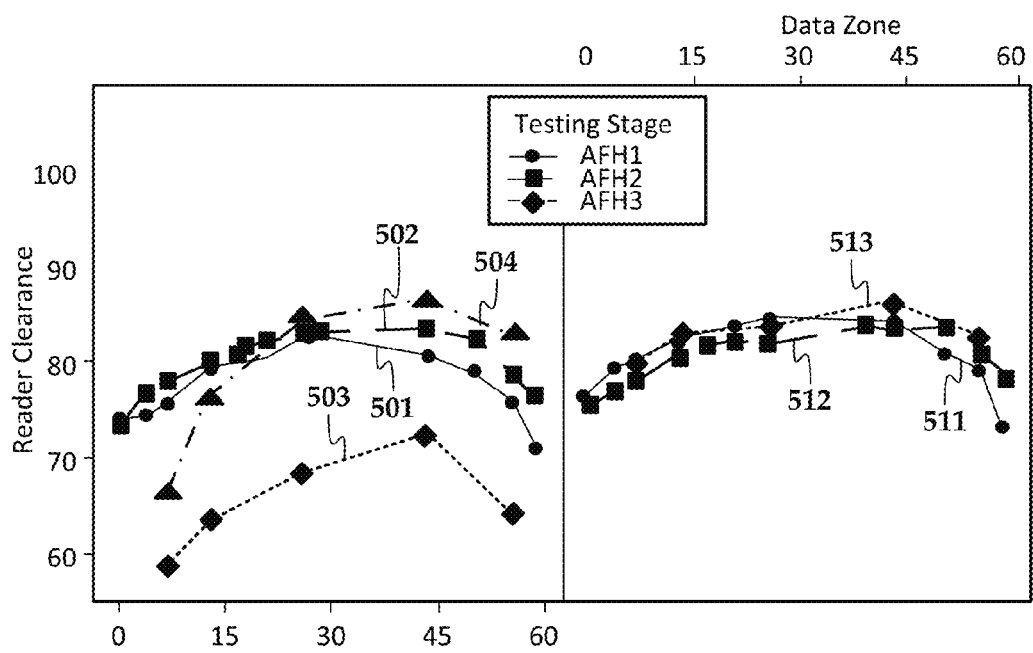
FIG. 5 is a graph showing head-media spacing drive before and after recovery using a procedure according to an example embodiment.

In FIG. 5, a graph shows an example of a drive successfully recovered using the procedure described above. In the left hand graph of FIG. 3, curves 501-503 represent the HMS measured over a range of zones for respective first, second and third AFH testing stages (AFH1-3) for a particular head. As seen by curve 503, the AFH3 stage shows a marked decrease in spacing across all zones. To remove contamination that was the cause of this spacing decrease, heater DAC values were increased as indicated by curve 504. Afterwards, the AFH1-3 were re-rerun, and the results indicated by curves 511-513. As the tight spacing between curves 511-513 indicates, the clearances are consistent across all zones and all testing stages.

Figure 6:
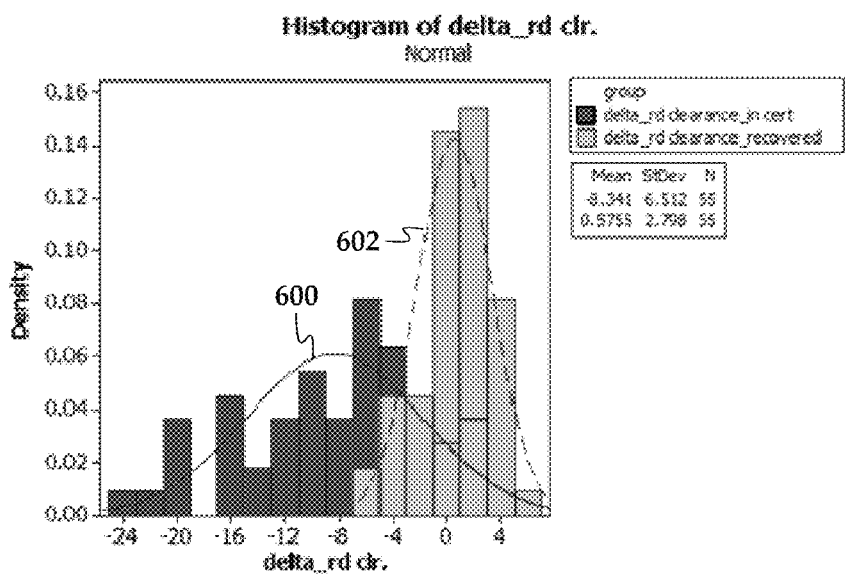
FIG. 6 a histogram showing distributions of inter-stage clearance deltas for tested units recovered using a procedure according to an example embodiment.

In FIG. 6, a histogram shows distributions of inter-stage clearance deltas for tested units. Units that failed had a distribution indicated by curve 600 (dark histogram bars). Curve 602 (light histogram bars) indicates clearance differences for the same units after mitigation as described above. The post-mitigation distribution 602 has smaller standard deviation and is closer to zero than the pre-mitigation distribution 600. It has been found that this mitigation technique helps 1.8% of heads pass certification testing with minimal clearances delta between AFH2 and AFH3.

Figure 7:
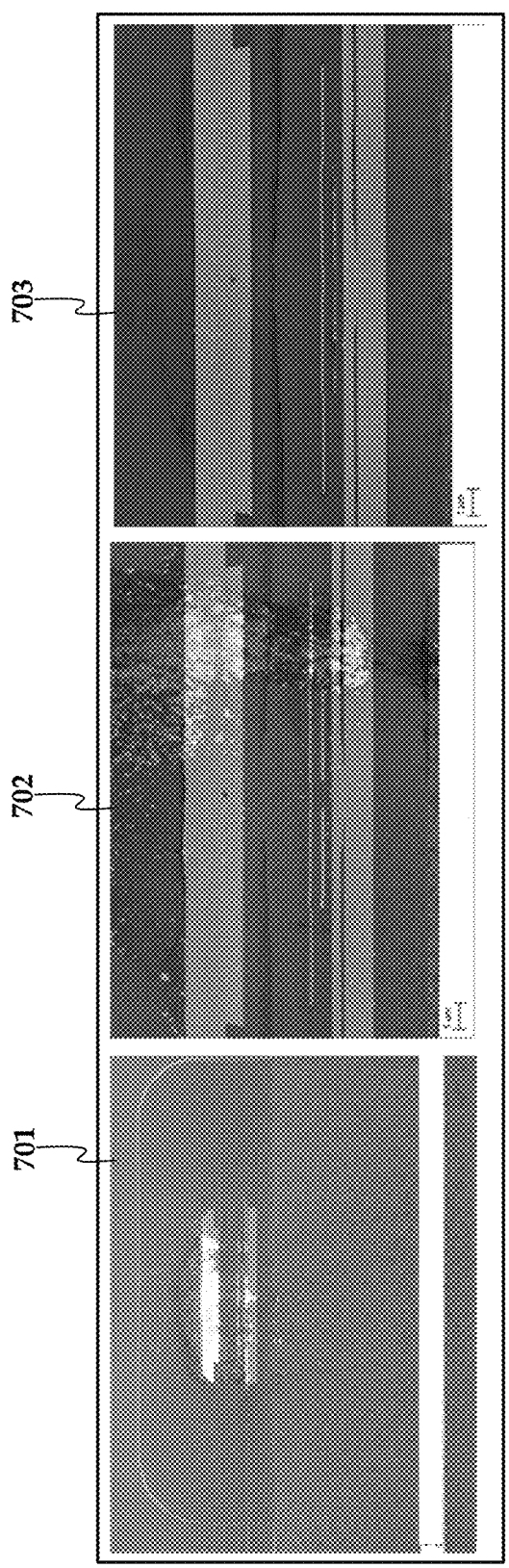
FIG. 7 includes microscope images showing a media-facing surface of a read/write head before and after undergoing procedures according to example embodiments.

In reference now to FIG. 7, microscope images show a media-facing surface of a read/write head before and after undergoing procedures according to an example embodiment. Image 701 is an 1800× magnification if a read/write head with contamination that caused an AFH testing failure. Image 702 a 3000× magnification of a contaminated write head that also failed AFH testing, where the only mediation was re-running the AFH testing stages (re-AFH). Image 703 shows a similar read/write head that failed AFH testing, and was subjected to additional heater power beyond contact to remove the contamination. Images of the disk (not shown) at ID, MD, and OD all appeared acceptably clean after the power beyond contact mitigation. Table 1 below also shows results of different methods of dealing with negative burnish.

TABLE 1

| Method | | Bench Total | Bench Articled Failure | Gemini Total | Gemini Articled Failure | ORT Total | ORT Articled Failure | Head FA by Sampling |
|---|---|---|---|---|---|---|---|---|
| Re-AFH | | | | 3 | 0 | 2 | 0 | 1/1, heavy contam. |
| Agitation | | 3 | 3 | | | | | |
| Apply DAC beyond Contact | value = 5 | 3 | 0 | 3 | 0 | 2 | 0 | 1/1, clean |
| | value = 10 | 6 | 0 | 6 | 0 | 3 | 0 | 2/2, slight smear |
| | value = 15 | 6 | 0 | 6 | 0 | 4 | 0 | 3/3, clean |

Figure 8:
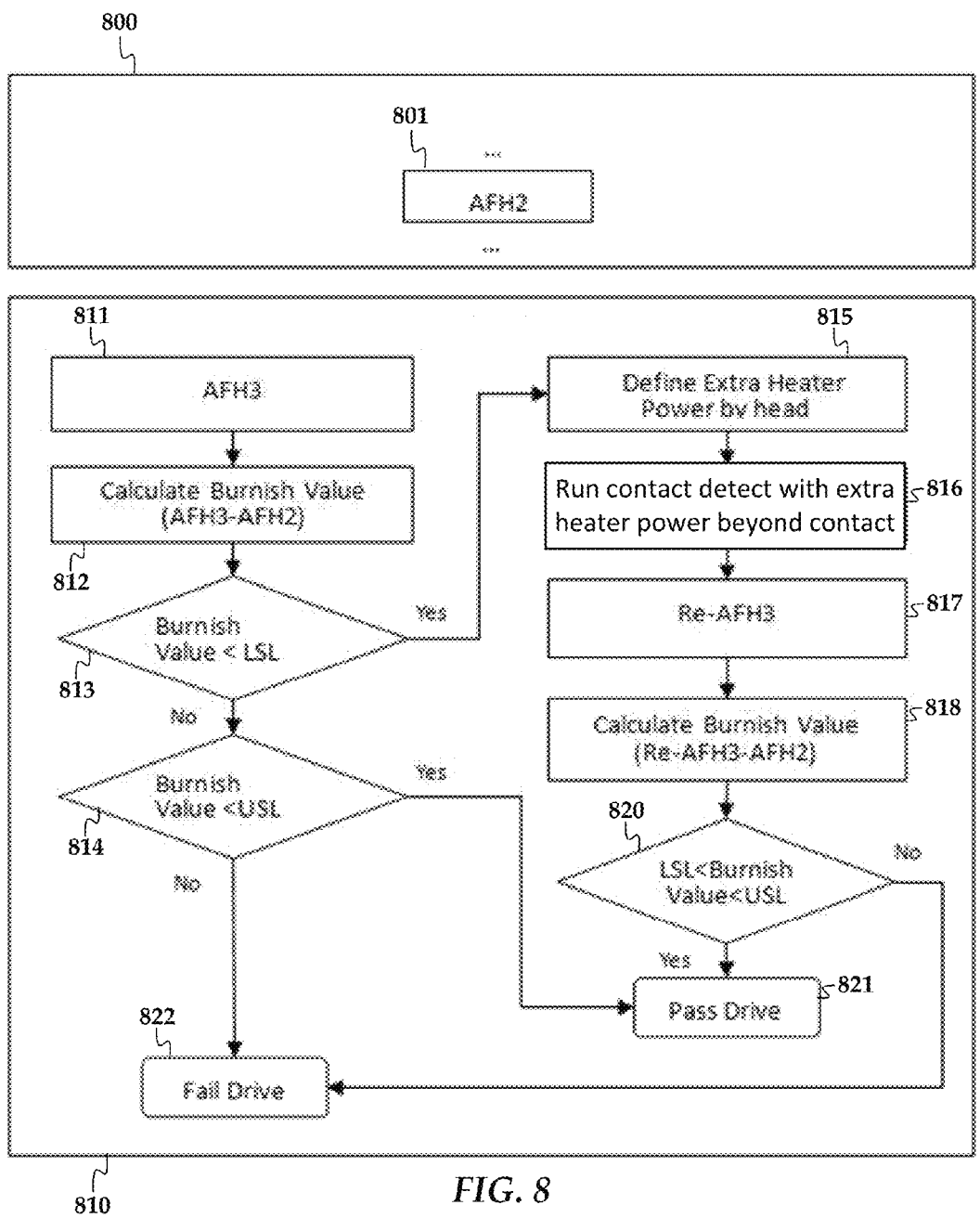
FIG. 8 is a flowchart illustrating a mitigation procedure according to an example embodiment.

In FIG. 8, a flowchart illustrates a mitigation procedure according to an example embodiment. At a testing stage 800, an adaptive fly height test 801 (AFH2) is run. At a subsequent testing stage 810, another adaptive fly height test 811 (AFH3) is run. A burnish value is calculated 812 by comparing fly heights of the previous tests 801, 811. It is determined 813 whether the burnish value is less than a lower specification limit (LSL), and if not, another determination 814 is made whether the burnish value is less than an upper specification limit (USL). Generally, the USL value is a threshold value that, if the burnish value is greater than the USL value, the drive will fail without attempting mitigation. The LSL value is a threshold that, if the burnish value is less than the LSL value, the drive will pass without attempting mitigation. Accordingly, if the burnish value at 812 is greater than or equal to LSL and less than USL, the drive passes 821. If the burnish value at 812 is greater than or equal to both LSL and USL, the drive fails 822.

If the burnish value is less than LSL, an extra amount of fly height actuator power (e.g., heater power) is defined 815. This extra heater power is added to the contact DAC that was previously calculated at AFH2. Then, a contact detection procedure 816 is run with the extra heater power in an attempt to mitigate the negative burnish, e.g., remove contamination. This procedure 816 may be run in different zones (e.g., ID, MD, OD tracks), and the amount of extra heater power may be specific to the tracks in those zones. After mitigation procedure 816, the AFH3 is re-run 817, and burnish value is calculated 818. The burnish value is checked again at 820 to determine whether it is between LSL and USL. If so, then the drive is passed 821, and fails 822 otherwise.

Figure 9:
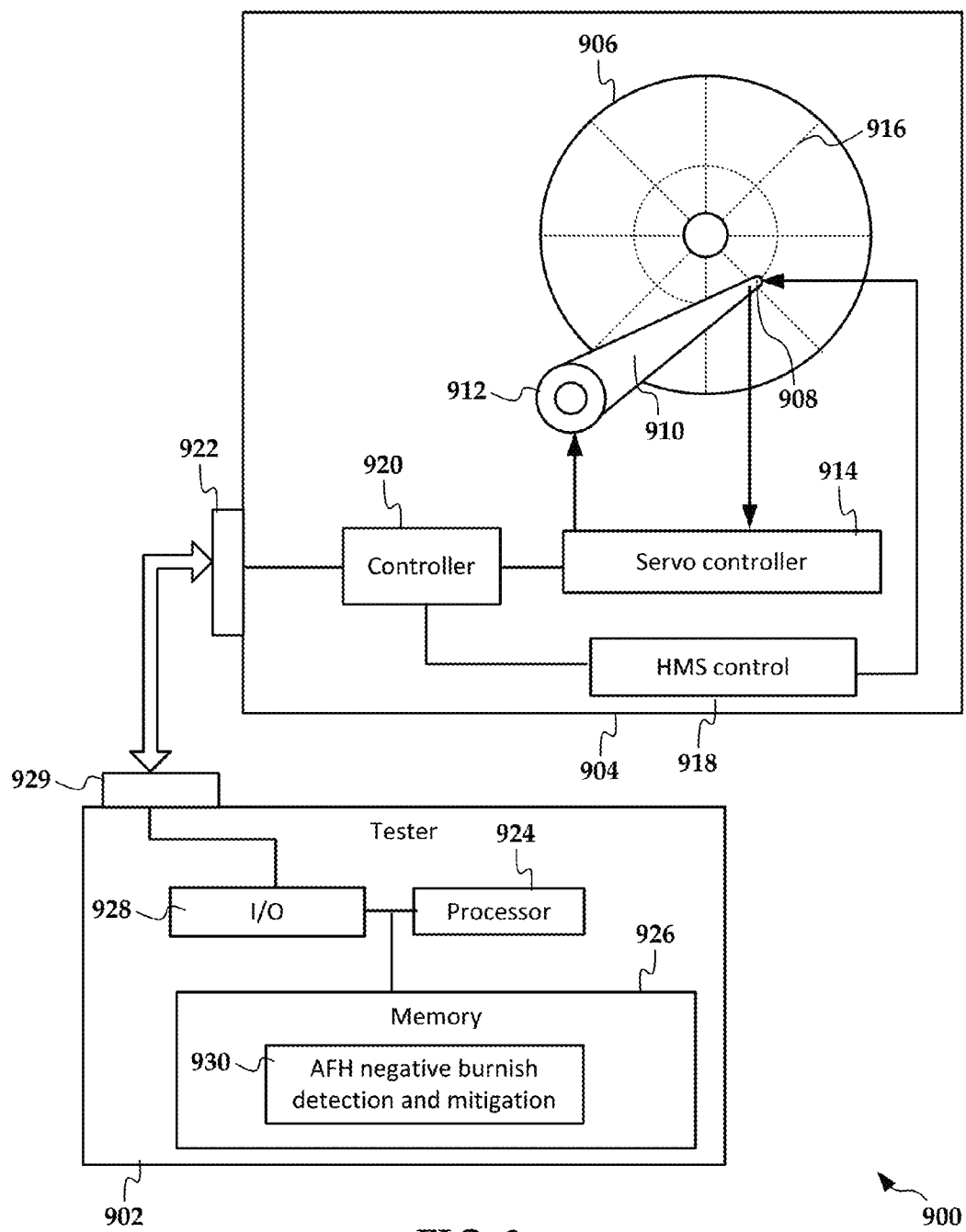
FIG. 9 is a block diagram of a system according to an example embodiment.

In FIG. 9, a block diagram illustrates components of a testing system 900 according to an example embodiment. The system 900 includes a testing apparatus 902 and tested hard drive device 904. The hard drive 904 includes a magnetic disk 906 used as a recording media. A read/write head 908 is mounted to an arm 910 that is driven radially via a voice coil motor 912 and optionally via a microactuator (not shown). A servo controller 914 reads servo marks 916 on the disk 906 via the read/write head 908. The service marks 916 facilitating locating where (e.g., which track) the read/write head 908 is located.

An HMS controller 918 provides signals to an AFH actuator (e.g., heater) of the read/write head 908. The HMS controller 918 may obtain feedback from sensors located on the read/write head 908 or elsewhere, such as thermal sensors, acoustic/vibration sensors, etc. A controller 920 provides high-level control of operations of the hard drive device 904, including HMS control and servo control. The controller 920 may facilitate operations of other components not shown, such as read/write channels, disk motor control, power distribution, etc.

The hard drive device 904 includes a host interface 922 for communicating with external devices, including the tester apparatus 902. The tester apparatus 902 may include conventional computing hardware, such as a processor 924, memory 926, and input/output (I/O) circuitry 928. The tester includes an interface 929 that may provide electrical and mechanical coupling to the hard drive device 904. The tester 902 is at least configured (e.g., via instructions stored in memory 926) to perform qualification tests on the hard drive device 904. The instructions include an AFH test module 930 that is configured to perform negative burnish detection and mitigation as described herein.

The AFH test module 903 may send commands via the hard drive device's host interface 922 or other I/O interface. These instructions detect a change in HMS between subsequent test stages, and perform a mitigation operation if the characteristics of the change suggest it is caused by negative burnish. The mitigation operations may include at least driving the read/write head clearance (via the HMS control 918) to protrude past a previously determined head-to-media contact point. The hard drive device 904 may include similar operational hardware or software (not shown) Instead of or in addition to the AFH test module 930 that performs some or all of the detection and mitigation steps independently.

Figure 10:
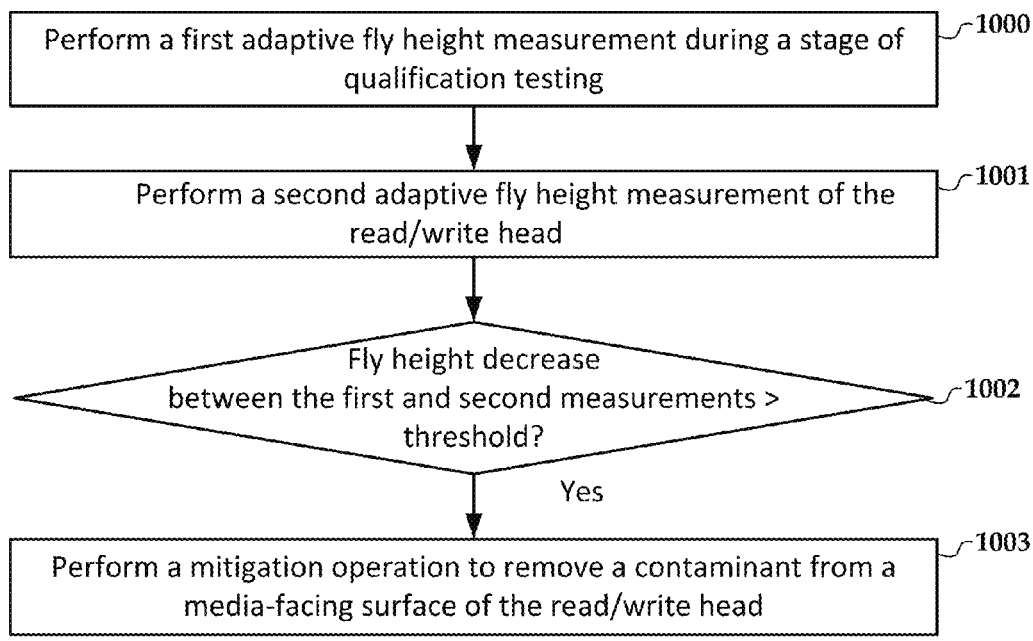
FIGS. 10 and 11 are flowcharts of procedures according to example embodiments.

In FIG. 10, a flowchart illustrates a method according to an example embodiment. The method involves performing 1000 a first adaptive fly height measurement between a read/write head and a recording medium during a stage of qualification testing of a magnetic disk drive. A second adaptive fly height measurement of the read/write head is performed 1001 during a subsequent stage of the qualification testing. In response to determining 1002 that a fly height decrease between the first and second adaptive fly height measurements is above a threshold value, a mitigation operation is performed to remove a contaminant from a media-facing surface of the read/write head.

Figure 11:
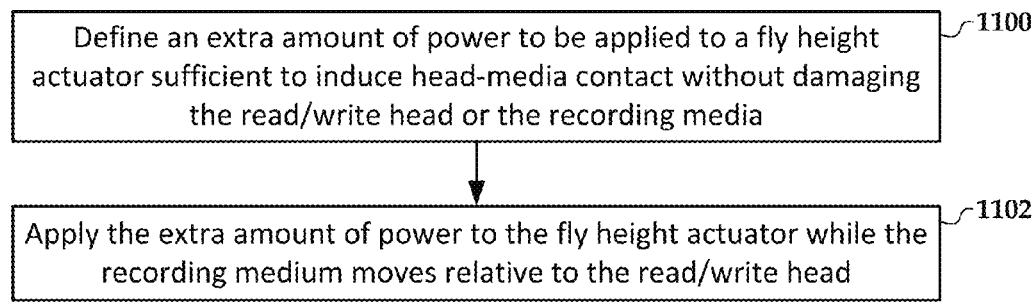

In FIG. 11, a flowchart illustrates a mitigation operations according to an example embodiment. The operation involves defining 1100 an extra amount of power to be applied to a fly height actuator that controls an adaptive fly height of the read/write head. The extra amount of power sufficient to induce head-media contact without damaging the read/write head or the recording media. The extra amount of power is applied 1102 to the fly height actuator while the recording medium moves relative to the read/write head. This may be over a set of tracks of the medium and/or during seeks over the medium.

The embodiments described above may be used with any type of magnetic disk drive. For example, conventional hard disk drives using perpendicular recording may utilize negative burnish testing as described above. This testing may be equally relevant for developing magnetic disk drive technologies, such as shingled media recording, heat-assisted magnetic recording, bit patterned media, etc. The testing may be used in hybrid devices as well, e.g., devices that combine magnetic media with solid-state, non-volatile memory (e.g., flash memory).

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
performing a first adaptive fly height measurement between a read/write head and a recording medium during a stage of qualification testing of a magnetic disk drive;
performing a second adaptive fly height measurement of the read/write head during a subsequent stage of the qualification testing; and
in response to determining that a fly height decrease between the first and second adaptive fly height measurements is above a threshold value, performing a mitigation operation to remove a contaminant from a media-facing surface of the read/write head.

2. The method of claim 1, wherein the mitigation operation comprises:
defining an extra amount of power to be applied to a fly height actuator that controls an adaptive fly height of the read/write head, the extra amount of power sufficient to induce head-media contact without damaging the read/write head or the recording medium; and
applying the extra amount of power to the fly height actuator while the recording medium moves relative to the read/write head.

3. The method of claim 2, wherein the extra amount of power is defined based on an amount of the fly height decrease.

4. The method of claim 2, wherein the extra amount of power is applied while the read/write head is held over at least one track of the recording medium.

5. The method of claim 4, wherein the at least one track comprises at least three tracks at an inner diameter, a middle diameter, and an outer diameter of the recording medium.

6. The method of claim 5, wherein the amount of power is specific to each of the three tracks.

7. The method of claim 1, wherein the first and second adaptive fly height measurements are taken over a plurality of zones of the recording medium, and wherein the fly height decrease is determined collectively over the plurality of zones.

8. The method of claim 1, wherein if the fly height decrease is above a second threshold value, failing the magnetic disk drive without attempting the mitigation operation.

9. The method of claim 1, further comprising after the mitigation operation:
performing at least the second adaptive fly height measurement of the read/write head a second time;
determining a second fly height decrease between the first adaptive fly height measurement and the second performance of the second adaptive fly height measurement; and
in response to the second fly height decrease being below the threshold value, passing the magnetic disk drive.

10. The method of claim 9, further comprising failing the magnetic disk drive in response to the second fly height decrease being above a second threshold value.

11. A testing apparatus comprising:
an interface configured to communicate with a hard disk drive device; and
a processor coupled to the interface and configured to:
perform a first adaptive fly height measurement between a read/write head and a recording medium during a stage of qualification testing of a magnetic disk drive;
perform a second adaptive fly height measurement of the read/write head during a subsequent stage of the qualification testing; and
in response to determining that a fly height decrease between the first and second adaptive fly height measurements is above a threshold value, perform a mitigation operation to remove a contaminant from a media-facing surface of the read/write head.

12. The testing apparatus of claim 11, wherein the mitigation operation comprises:
defining an extra amount of power to be applied to a fly height actuator that controls an adaptive fly height of the read/write head, the extra amount of power sufficient to induce head-media contact without damaging the read/write head or the recording medium; and
applying the extra amount of power to the fly height actuator while the recording medium moves relative to the read/write head.

13. The testing apparatus of claim 12, wherein the extra amount of power is defined based on an amount of the fly height decrease.

14. The testing apparatus of claim 12, wherein the extra amount of power is applied while the read/write head is held over at least one track of the recording medium.

15. The testing apparatus of claim 14, wherein the at least one track comprises at least three tracks at an inner diameter, a middle diameter, and an outer diameter of the recording medium.

16. The testing apparatus of claim 15, wherein the amount of power is specific to each of the three tracks.

17. The testing apparatus of claim 11, wherein the first and second adaptive fly height measurements are taken over a plurality of zones of the recording medium, and wherein the fly height decrease is determined collectively over the plurality of zones.

18. The testing apparatus of claim 11, wherein if the fly height decrease is above a second threshold value, failing the magnetic disk drive without attempting the mitigation operation.

19. The testing apparatus of claim 11, wherein the processor is further configured to, after the mitigation operation:
perform at least the second adaptive fly height measurement of the read/write head a second time;
determine a second fly height decrease between the first adaptive fly height measurement and the second performance of the second adaptive fly height measurement; and
in response to the second fly height decrease being below the threshold value, pass the magnetic disk drive.

20. The testing apparatus of claim 19, wherein the processor is further configured to fail the magnetic disk drive in response to the second fly height decrease being above a second threshold value.

* * * * *